(12) United States Patent
Olk et al.

(10) Patent No.: US 6,467,658 B1
(45) Date of Patent: Oct. 22, 2002

(54) COORDINATE LOOP GARMENT HANGER

(75) Inventors: Olaf F. Olk, Hauppauge; Stanley F. Gouldson, Northport, both of NY (US)

(73) Assignee: Spotless Plastics Pty. Ltd., Moorabbin (AU)

( * ) Notice: Subject to any disclaimer, the term of this patent is extended or adjusted under 35 U.S.C. 154(b) by 0 days.

(21) Appl. No.: 09/653,140

(22) Filed: Aug. 31, 2000

(51) Int. Cl.$^7$ ............................................. A41D 27/22
(52) U.S. Cl. .......................................... 223/88; 223/85
(58) Field of Search ..................... 223/88, 85

(56) References Cited

U.S. PATENT DOCUMENTS

| | | |
|---|---|---|
| 1,429,835 A | 9/1922 | Biener |
| 1,910,629 A | 5/1933 | Navarte |
| 3,515,319 A | 6/1970 | Furtak et al. |
| 4,416,401 A * | 11/1983 | King ........................... 223/88 |
| D275,539 S | 9/1984 | Mainetti |
| 4,653,678 A | 3/1987 | Blanchard et al. |
| 4,871,098 A | 10/1989 | Bredeweg et al. |
| 5,074,446 A | 12/1991 | Suddath |
| D394,753 S | 6/1998 | Zuckerman |
| 5,803,321 A * | 9/1998 | Willinger et al. ............. 223/88 |
| 6,105,834 A | 8/2000 | Cohen |

FOREIGN PATENT DOCUMENTS

| | | | | |
|---|---|---|---|---|
| GB | 677987 | * | 6/1949 | ................... 223/88 |
| GB | 2266 659 A | * | 10/1993 | ................... 223/88 |
| GB | 2 266 659 | | 11/1993 | |

* cited by examiner

Primary Examiner—Rodney M. Lindsey
Assistant Examiner—James G Smith
(74) Attorney, Agent, or Firm—Scully, Scott, Murphy & Presser

(57) ABSTRACT

A coordinate loop garment hanger comprising a molded plastic hanger body having a hook receiving loop element depending from and molded integrally with the molded plastic body at a lower portion thereof. The hook receiving loop element includes a passageway for selectively receiving and suspending therefrom a hook of a second ganged garment hanger which is at least partially enclosed along its length by left, right, top and bottom surfaces. In one embodiment, the left, right, top and bottom surfaces define substantially parallel left and right sides and rounded and curved top and bottom surfaces. The passageway is also curved along its length, with the open ends thereof being slightly lower than the center thereof. Several different embodiments of the loop element are disclosed with different length and shape sides, bottoms and ends. Several different embodiments are also disclosed of the cross sectional shape of the passageway defined by the loop element, including downward tapering, upward tapering, circular and hourglass shaped passageways. A mold and a method are also disclosed for molding the coordinate loop garment hanger body. The mold comprises first and second mold halves and a moveable mold piece which is pivotally inserted into the mold shape of the loop element during a molding operation to define and mold the interior shape of the passageway.

36 Claims, 5 Drawing Sheets

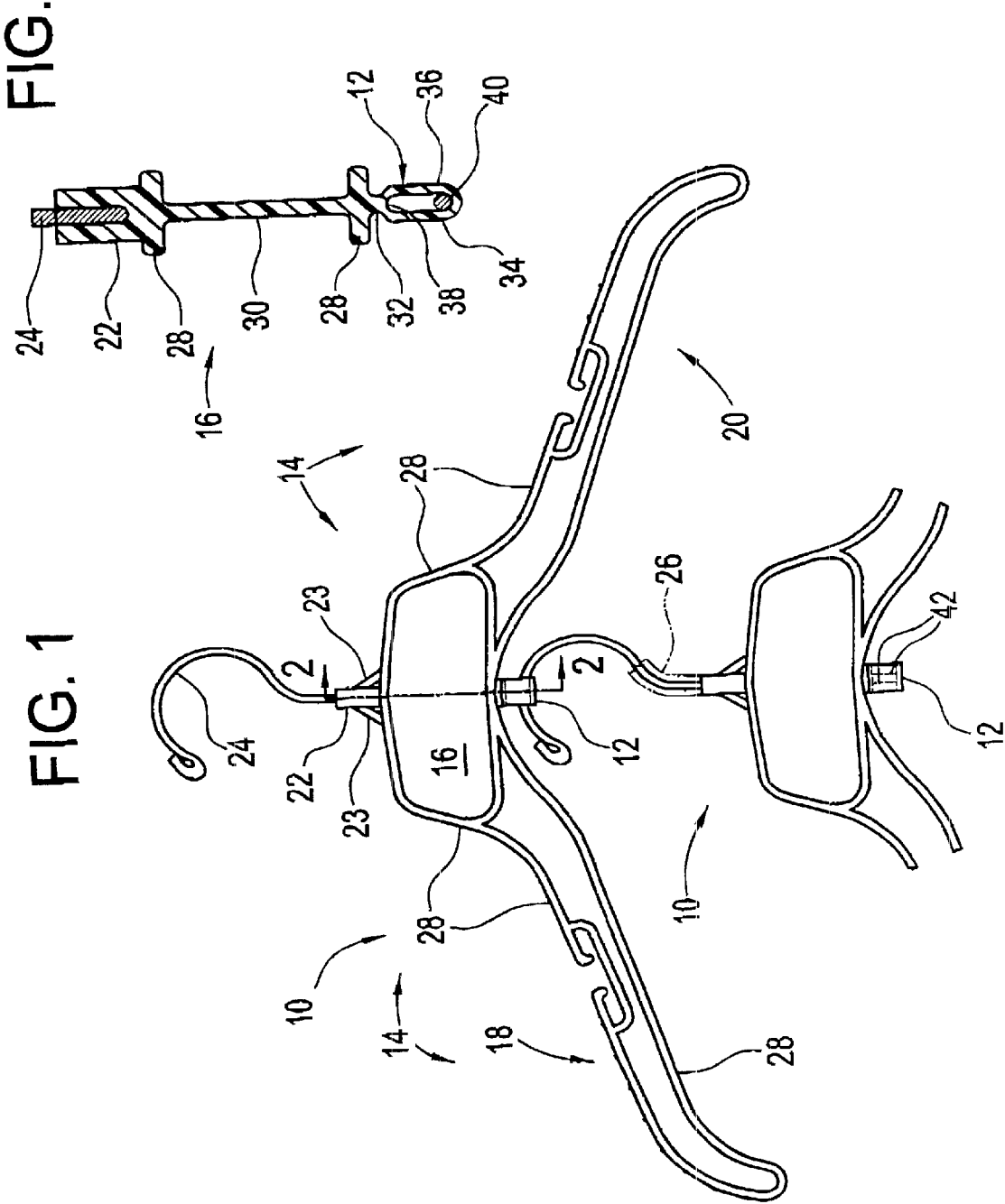

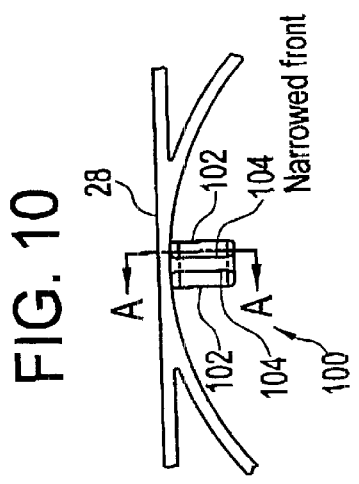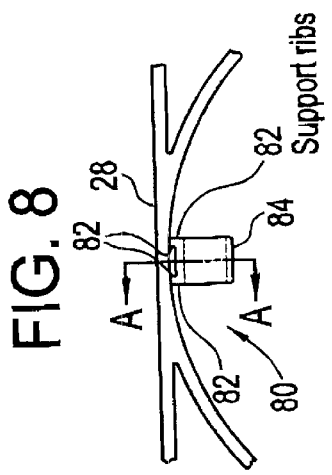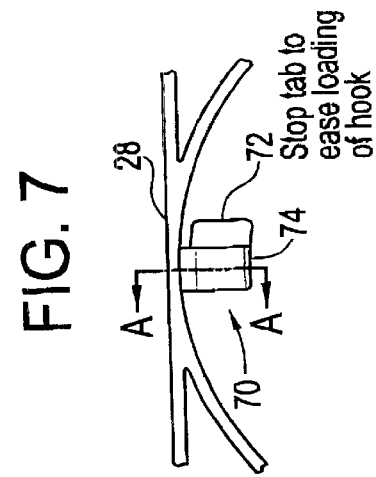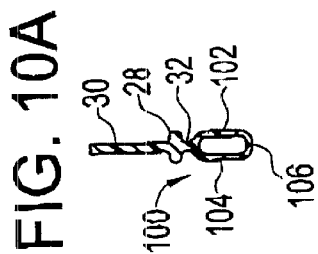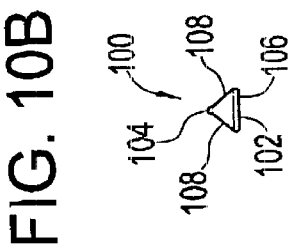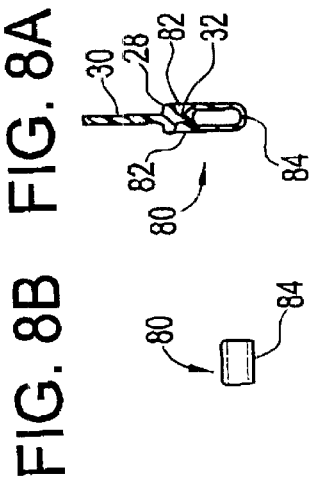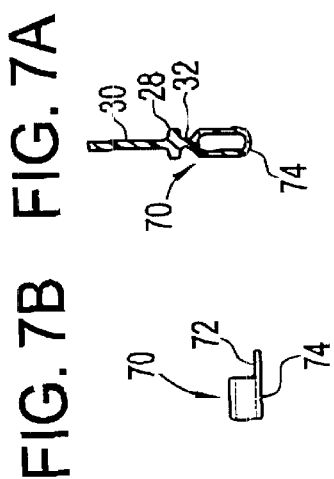

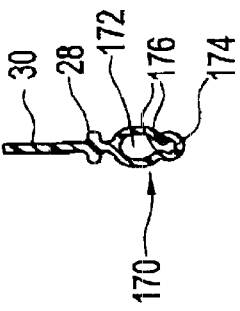
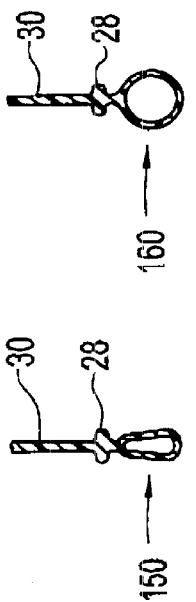
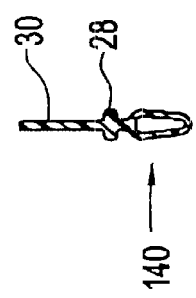
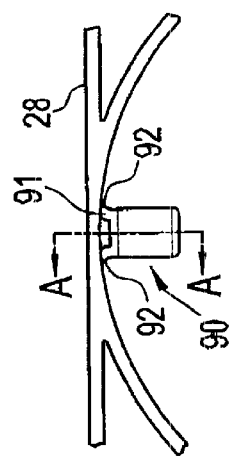
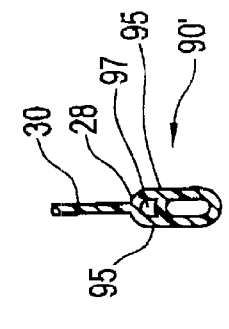
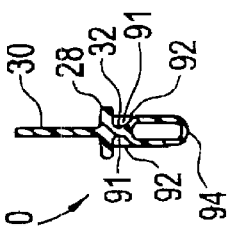
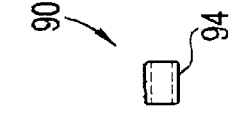

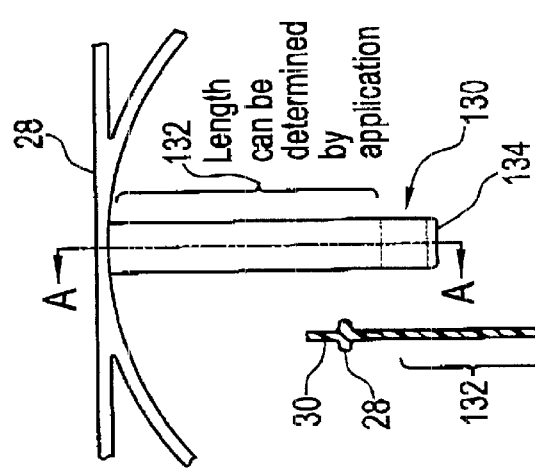
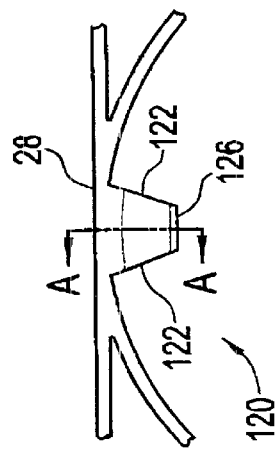
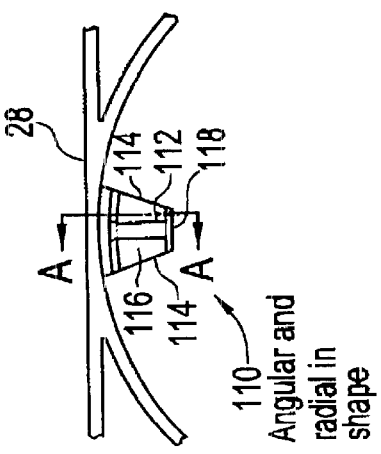
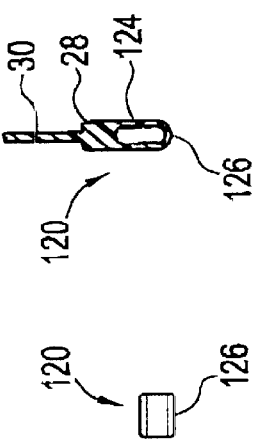
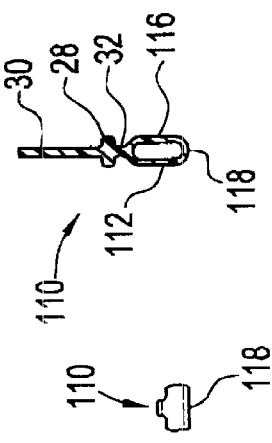

COORDINATE LOOP GARMENT HANGER

BACKGROUND OF THE INVENTION

1. Field of the Invention

The present invention relates generally to a garment hanger, and more particularly pertains to a coordinate loop garment hanger having a hook receiving closed loop dependent from the bottom thereof for selectively receiving and suspending therefrom a hook of a second ganged garment hanger. The present invention also relates generally to a mold for molding a coordinate loop garment hanger and a method of molding a coordinate loop garment hanger.

2. Discussion of the Prior Art

It can be appreciated that many garments are designed to be worn and sold as coordinated outfits or sets. For example, a coordinate jacket and pant set, a coordinate jacket and top set, a coordinate short and top set, and other such coordinate combinations may be specifically manufactured to be sold as sets. In the sale of such coordinate garment sets, it is desirable to display these garments together to convey to the consumer that the garments are indeed a set to be purchased together. To that end the separate garments may be hung on separate hangers and displayed alongside or next to each other, or the garments may be hung on a single hanger. The drawbacks in such display methods are that in the first example some frame or support is required to display the garments together, and in the second example sharing a hanger may obscure one of the individual garments that make up the coordinate garment set.

It can also be appreciated that a further benefit in displaying such coordinate garment sets together, or in displaying garments of a similar style and color together, is that the amount of required display space can be significantly reduced. A still further benefit of displaying such coordinate items together is to make it easier for the consumer to find and purchase such garments. This economy of space and ease of organization may also extend to the transport and storage of such garments.

Moreover, in many cases, each separate garment requires a hanger of a different type, such as a hanger suitable for displaying a blouse used with a hanger capable of supporting a skirt or a pair of slacks. For this purpose, it has long been a practice to utilize hanger structures in which two hangers are ganged together, with one being suspended from the other. In other cases, attachments have been designed with the attachment constructed to be temporarily or permanently connected to a supporting hanger. These arrangements have not been satisfactory because they have normally required the hangers to be of such a design that they do not have utility other than as ganged hangers for simultaneous multiple garment display and transport. When hangers of conventional construction have been modified to permit ganging, they have either involved a difficult and complex structure for attaching one garment hanger to the other or they have not been satisfactory in transportation because the vibration and jostling incident to transportation causes the hangers to become disconnected, allowing one of the garments to fall to the floor or the bottom of the transport container. This same lack of security of attachment has also been a problem at the point of display unless the hangers are carefully handled. It is also an important requirement that the cost of the hangers be kept as low as possible to meet the necessities of the garment manufacturing and merchandising field.

Prior art ganged garment hangers having a molded plastic body construction with an integral hook receiving element depending therefrom for suspending a second lower garment hanger are generally molded in a two piece separable mold. This method of manufacture requires that the component features of the molded garment hangers have symmetrical shapes which can be defined by the first and second halves of the two piece separable mold with no cavities therein which cannot be molded and completely defined by the two halves of the two piece separable mold.

This requirement has resulted in prior art designs for ganged garment hangers wherein the left and right elements defining the left and right halves of the hook receiving passageway of the suspension element have not been aligned with respect to each other along the direction of opening and closing of the mold, such that the left mold half can define the left side of each of the left and right side elements of the hook receiving passageway, and the right mold half can define the right side of each of the left and right side elements of the hook receiving passageway.

This requirement has resulted in prior art designs for ganged garment hangers wherein the left and right side elements defining the hook receiving passageway have been staggered or nonaligned with respect to each other along the length of the hook receiving passageway, to allow the left and right sides of each of the left and right side elements defining the hook receiving passageway to be defined and molded by the left and right mold halves.

Examples of the staggering or nonalignment of the left and right side elements defining the hook receiving passageway along the length of the hook receiving passageway are illustrated in Blanchard et al. U.S. Pat. No. 4,653,678 wherein elements 21 and 22 are staggered along the length of the hook receiving passageway, and willinger et al. U.S. Pat. No. 5,803,321 wherein elements 42 and 44 are staggered along the length of the passageway, and Zuckerman U.S. Design 394,753.

Moreover, the staggering or nonalignment of the left and right side elements defining the hook receiving passageway along the length of the hook receiving passageway has resulted in several disadvantages for such prior art ganged garment hangers. The strength and durability of the hook receiving element is compromised by the design, resulting in more frequently broken hook receiving elements. The designs of the hook receiving element are also more complex and less compact. Moreover, the relatively complex shapes of the left and right side molds forming the hook receiving element result in mold shapes which are not easy to manufacture and which are more subject to wear and scoring over time with continued commercial usage of the molds.

The prior art also discloses hydraulically actuated mold pieces for moving mold pieces into and out of molding positions during and after molding operations. However, such hydraulical actuators are often large and cumbersome, and would not be able to be physically positioned in a relatively small mold such as a mold for a coordinate loop garment hanger pursuant to the present invention.

SUMMARY OF THE INVENTION

Accordingly, it is a primary object of the present invention to provide a coordinate loop garment hanger having a hook receiving closed loop dependent from the bottom thereof for selectively receiving and suspending therefrom a hook of a second ganged garment hanger.

A further object of the subject invention is the provision of a mold for molding a coordinate loop garment hanger having a hook receiving closed loop dependent therefrom, and also a method for molding a coordinate loop garment hanger having a hook receiving closed loop dependent therefrom.

In accordance with the teachings herein, the present invention provides a coordinate loop garment hanger comprising a molded plastic hanger body having a hook receiving loop element depending from and molded, integrally with the molded plastic body at a lower portion thereof. The hook receiving loop element includes a passageway for selectively receiving and suspending therefrom a hook of a second garment hanger. The passageway is defined by left and right side elements along opposite sides of the length of the passageway, which is defined along the direction a hook from a dependent garment hanger is inserted into and through the passageway. Pursuant to the teachings herein, at least a portion of the left and right side elements are aligned substantially perpendicularly across from each other along the left and right sides of the length of the passageway. A hook member is joined to the molded plastic hanger body at an upper portion thereof.

In greater detail, the loop element is at least partially enclosed, and in several embodiments is completely enclosed, by left, right, top and bottom surfaces along its length, with open ends at opposite ends of its length.

In several embodiments the loop element defines a substantially rectangular shaped passageway having substantially parallel left and right sides and rounded top and bottom surfaces. The passageway is curved along its length, with the open ends of the passageway being slightly lower than the center of the passageway. The top of the passageway curves with a radius R1 along the length of the passageway, the bottom of the passageway curves with a radius R2 along the length of the passageway, and R1>R2.

In several embodiments the widths of the left, right, top and bottom walls forming the loop element are all substantially equal. The external width of the loop element between its left and right outer surfaces is less than the width of a flange member on the lower portion of the plastic hanger body to which the loop element is integrally attached. The loop member is attached to the flange member by an attachment web which extends the length of the loop member and has a width substantially equal to the width of the walls of the loop element.

In one embodiment, the hook member comprises a formed metal wire hook member secured to the molded plastic hanger body at a central upper portion thereof. In an alternative embodiment, the hook member can comprise a molded plastic hook member which is integrally molded with the hanger body at a central upper portion thereof.

In a further embodiment, the hook receiving loop element also defines a second passageway centrally located along the length of the loop member and extending substantially perpendicularly to the length of the loop member, such that a second garment hanger can be suspended with its length extending substantially perpendicular to the length of the upper garment hanger.

In another embodiment, the loop element defines a stop tab projecting from one end of one side of the loop element to assist and guide the insertion and loading of a hanger hook through the loop element.

In another embodiment, a supporting flange member is positioned on the lower portion of the plastic hanger body, to which the loop element is integrally molded and attached, and support ribs are positioned on opposite ends of the loop element. The support ribs have the same width as the loop element and the flange member, and serve to further secure the loop element to the flange member.

In another embodiment, the supporting flange member is integrally molded with left and right downwardly extending support ribs which are also integrally molded with the left and right sides of the loop element. A crescent shaped aperture is formed above the loop element passageway which extends along the length thereof.

In another embodiment, one side of the loop element comprises a centrally positioned short length side element, and the second side of the loop element comprises a centrally positioned longer length side element, which assists and guides the insertion and loading of a hanger hook through the loop element from either end. The opposite ends of the loop element can be angled inwardly towards each other proceeding in a downward direction.

In another embodiment, the loop element is integrally molded with and is the same width as the supporting flange.

In another embodiment, the loop element is attached to the bottom flange member by an elongated attachment web. In some embodiments the elongated attachment web can have a vertical length substantially longer than the height of the loop element.

The cross sectional shape of the passageway defined by the hook receiving loop element can have a variety of different shapes other than the rounded rectangular shape described above. It can taper from a wider width at the top thereof to a narrower width at the bottom, or taper from a narrower width at the top thereof to a wider width at the bottom, or can be substantially circular. In one embodiment, the cross sectional shape of the passageway defined by the hook receiving loop element tapers from a wider width at the top portion to a narrower width at the bottom portion. The width of a transition junction between the top portion and the bottom portion is slightly narrower than the width of the bottom portion to define an hourglass shape. The width at the transition junction can be slightly narrower than the width of a hanger hook, such that a hanger hook inserted and loaded through the top portion must be forcibly pushed and snapped through the junction, which provides a very secure retention of the hanger hook in the bottom portion The present invention is also directed to a mold and a method of molding a plastic garment hanger body having a hook receiving loop element depending therefrom, and also to the mold for molding the molded plastic hanger body. The mold is comprised of first and second mold halves which include cavities which define the mold shape of the hanger body. The mold further comprises a moveable mold piece which is inserted into the mold shape of the loop element of the plastic hanger body during a molding operation to define and mold the interior shape of the passageway. The moveable mold piece is subsequently withdrawn from the passageway defined thereby to allow the plastic hanger body to be released from the mold.

In greater detail, the moveable mold piece is automatically inserted into the mold shape of the loop element when the mold halves are closed, and is automatically withdrawn from the mold shape of the loop element when the mold halves are opened. The moveable mold piece is pivotally supported about a pivot pin on the first mold half. The interior shape of the passageway through the loop element is defined by the cross sectional shape of a projecting end of the movable mold piece, which has an outer radius R1 and an inner radius R2, such that the top of the passageway curves with a radius R1 along the length of the passageway, the bottom of the passageway curves with a radius R2 along the length of the passageway, and R1>R2. The second mold half supports a cam element which pivotally moves moveable mold piece as the first and second mold halves are opened and closed relative to each other. The cam element comprises a cam pin which extends through an aperture in the moveable mold piece, and also extends through an aperture in the first mold half. The cam pin is angularly supported and positioned relative to the direction of closing and opening of the first and second mold halves to cause the moveable mold piece to pivot into and out of the mold shape of the loop element.

BRIEF DESCRIPTION OF THE DRAWINGS

The foregoing objects and advantages of the present invention for a coordinate loop garment hanger may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 1 is a front elevational view of a pair of ganged garment hangers constructed pursuant to the teachings of the present invention, wherein each garment hanger includes a hook receiving loop element depending therefrom to allow another ganged garment hanger to be suspended thereby.

FIG. 2 is a cross sectional view of the top garment hanger of FIG. 1, taken along arrows 2—2 in FIG. 1, and particularly illustrates the closed structure of the dependent hook receiving loop element.

FIGS. 7, 7A and 7B illustrate a further embodiment of a hook receiving closed loop element having a stop tab projecting from the right back side of the loop element to assist and guide the insertion and loading of a hanger hook through the loop element.

FIGS. 8, 8A, and 8B illustrate a further embodiment of a hook receiving closed loop element having support ribs on opposite ends of the loop element and the attachment web which further secure the loop element to the supporting flange member, to reinforce the strength of the attachment web.

FIGS. 9, 9A, and 9B illustrate a further embodiment of a hook receiving closed loop element having support ribs on opposite ends of the loop element and the attachment web which further secure the loop element to the supporting flange member, to reinforce the strength of the attachment web.

FIG. 9C is a sectional view of another embodiment of a hook receiving closed loop element wherein the supporting flange member is integrally molded with two support ribs which are also integrally molded with the left and right sides of the closed loop element.

FIGS. 10, 10A, and 10B illustrate a further embodiment of a hook receiving closed loop element having a back side which extends for the full length of the loop element, and a centrally located narrow front side, the structure of which should assist and guide the insertion and loading of a hanger hook through the loop element from either end.

FIGS. 11, 11A and 11B illustrate a further embodiment of a hook receiving closed loop element which has a centrally located narrow front side similar to the embodiment of FIG. 10, and wherein the opposite ends of the back side of the loop element are angled inwardly towards each other proceeding in a downward direction.

FIGS. 12, 12A and 12B illustrate a further embodiment of a hook receiving fully enclosed loop element enclosed by full length sides, wherein the opposite ends of the loop element are angled inwardly towards each other proceeding in a downward direction, and the top of the loop element is integrally formed with and the same width as the supporting flange.

FIGS. 13, 13A and 13B illustrate a further embodiment of a hook receiving closed loop element which is attached to the bottom flange member by an elongated attachment web, the length of which in a vertical direction would be determined by the particular coordinated outfit application.

FIG. 14 illustrates a further embodiment wherein the cross sectional shape of the passageway defined by the hook receiving loop element tapers from a wider width at the top thereof to a narrower width at the bottom thereof.

FIG. 15 illustrates a further embodiment wherein the cross sectional shape of the passageway defined by the hook receiving loop element tapers from a narrower width at the top thereof to a wider width at the bottom thereof.

FIG. 16 illustrates a further embodiment wherein the cross sectional shape of the passageway defined by the hook receiving loop element is substantially circular.

FIG. 17 illustrates a further embodiment wherein the cross sectional shape of the passageway defined by the hook receiving loop element tapers from a wider width at the top to a narrower width at the bottom, with a still narrower width at the transition junction between the top and bottom, such that a hanger hook inserted and loaded through the top portion must be forcibly pushed and snapped through the junction, which provides a very secure retention of the hanger hook in the bottom portion.

DETAILED DESCRIPTION OF THE DRAWINGS

Figure 5:
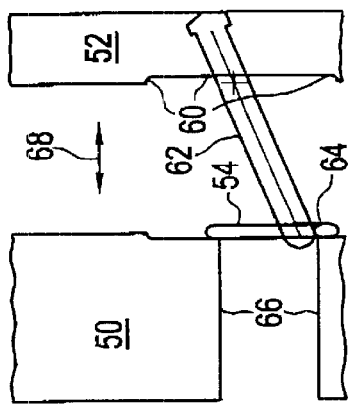
FIGS. 5 and 6 illustrate the operation of an angled cam pin which is used to mechanically displace a moveable mold piece which is used to form the interior passageway of the hook receiving loop element as the first and second sides of the mold are opened and closed during molding operations.

Referring to the drawings in detail, FIG. 1 is a front elevational view of a pair of ganged garment hangers 10 constructed pursuant to the teachings of the present invention, wherein each garment hanger includes a hook receiving loop element 12 depending therefrom to allow another ganged garment hanger to be suspended thereby.

Hanger 10 includes a hanger body 14 having a central body member 16 and a pair of downwardly sloping arms 18 and 20 extending therefrom. The central body member 16 includes an upper portion which includes a centrally located boss 22, to which a conventional metal hook member 24 is rotatably mounted for suspending the garment hanger 10. The boss 22 is reinforced by flanges 23 on opposite sides thereof which are also integrally molded and joined to an upper structural flange 28.

The hook is fabricated from wire stock and is connected to the hanger by insertion into the boss 22, and removal therefrom is prevented by any conventional attachment such as a threaded connection therebetween or on anchor clip. As illustrated in phantom at 26 in the lower garment hanger of FIG. 1, in an alternative embodiment the hook member may be formed of a suitable polymer molded integral with the body member 14.

FIG. 2 is a cross sectional view of the top garment hanger 10 of FIG. 1, taken along arrows 2—2 in FIG. 1, and particularly illustrates details of the construction of the hanger body 14 and the closed structure of the dependent hook receiving loop element 12. The hanger body 14 has a general I-beam construction wherein the hanger body 14 is provided with an enlarged peripheral flange or lip 28 extending entirely about an outermost edge of the hanger body 14 and also around the central body member 16. The flange 28 has a width which is substantially greater than the width of a central vertical web 30 of the hanger body. All of this structure is conventional, particularly, in the field of one piece, integral molded plastic garment hangers.

The peripheral flange 28 reinforces the construction of the garment hanger 10, and also provides an enlarged surface to which the hook receiving loop element 12 is integrally molded and joined by an attachment web 32.

It should be appreciated that the specific embodiment of the garment hanger described herein is merely for the purpose of illustration and that the hook receiving loop element 12 of the present invention may be mounted on any number of polymer based molded garment hangers in use today. The hook receiving loop element 12 is disposed below the central body member 16 and is joined to the lower flange 28 preferably in vertical alignment with the central boss 22 and hook member 24.

As illustrated by FIG. 2, the hook receiving loop element 12 defines a substantially rectangular shaped passageway, with the length of the rectangle extending vertically, having substantially parallel left and right sides 34, 36, and rounded top and bottom surfaces 38, 40. The vertical height of the passageway is such that a hook 24 of a ganged garment hanger can easily pass therethrough along the length of the passageway.

Figure 3:
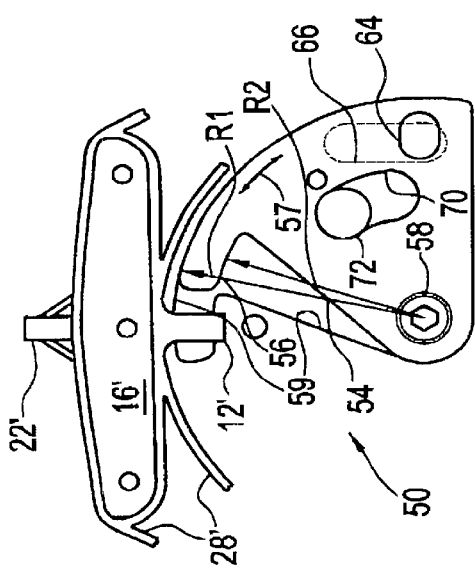
FIG. 3 is a partial view of a first side of a mold used to manufacture and mold a garment hanger with a dependent hook receiving loop element pursuant to the present invention.

The passageway is slightly curved along its length, such that the open ends of the passageway are slightly lower than the mid center of the passageway. This has an advantage that the curve of the passageway along its length conforms the passageway more closely to the curve of the hook 24 of a dependent ganged garment hanger. The curve of the passageway along its length is caused by the mold for molding the body of the garment hanger. Referring briefly to FIG. 3, which is explained in detail below, the interior shape of a passageway is defined by the cross sectional shape of projecting end piece 56, which has an outer radius R1 and an inner radius R2, such that the top of the passageway curves with a radius R1 along the length of the passageway, and the bottom of the passageway curves with a radius R2 along the length of the passageway, and causes the bottom of the passageway in particular to conform more closely to the curve of a hook 24.

AS illustrated in FIG. 2, the widths of the left, right, top and bottom walls forming the loop element 12 are all substantially equal. The loop member is attached to the bottom flange member 28 by the attachment web 32 which extends the full length of the loop member 12 and which has a width substantially equal to the width of the walls of the loop element. The external width of the loop element between its left and right outer surfaces 34, 26 is less than the width of the flange member 28 on the lower portion of the plastic hanger body to which the loop element is integrally attached.

In one alternative embodiment illustrated in phantom by the lower garment hanger of FIG. 1, the hook receiving loop element 12 can also define a second passageway 42 centrally located along the length thereof and extending substantially perpendicularly to the length of the loop member. The second passageway 42 can suspend a second garment hanger with the length of the second hanger extending substantially perpendicular to the length of the top garment hanger.

As discussed in relation to the prior art in the background of the invention, prior art ganged garment hangers having a molded plastic body construction with an integral hook receiving element depending therefrom for suspending a second lower garment hanger are generally molded in a two piece separable mold. This method of manufacture requires that the component features of the molded garment hangers have symmetrical shapes which can be defined by the first and second halves of the two piece separable mold with no cavities therein which cannot be molded and completely defined by the two halves of the two piece separable mold.

The coordinate look garment hanger of FIG. 1 cannot be molded in such prior art molds because the passageway extending through the hook receiving loop element 12 provides a cavity which cannot be molded and completely defined by the two halves of a normal prior art two piece separable mold.

Figure 4:
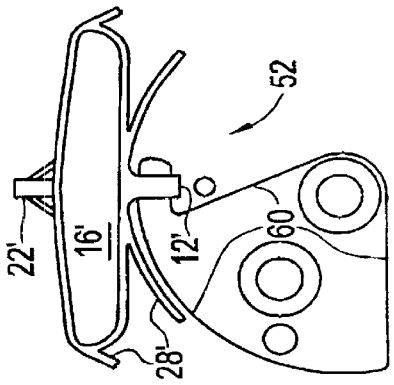
FIG. 4 is a partial view of a second side of a mold used to manufacture and mold a garment hanger with a dependent hook receiving loop element pursuant to the present invention.

FIGS. 4 and 5 are partial views of first and second sides 50, 52 of a mold used to manufacture and mold a garment hanger 10 with a dependent hook receiving loop element 12 pursuant to the present invention. The first and second mold halves 50, 52 include cavities which define the mold shape of the hanger body, as illustrated by prime numerals 12', 16', 22' and 28' for molding the corresponding portions 12, 16, 22 and 28 of the coordinate loop garment hanger.

The mold further comprises a moveable mold piece 54 having a projecting end piece 56 which has a cross sectional shape which is the same as and defines the cross sectional interior of the passageway extending through the loop element 12. The projecting end piece 56 is pivotally moved and inserted into the mold shape of the loop element 12 of the plastic hanger body during a molding operation to define the interior of the passageway. After the molding operation, the moveable mold piece is withdrawn from the passageway defined thereby in the molded loop element 12 to allow the plastic hanger body 14 to be released from the mold.

In different embodiments, the projecting end piece 56 can be formed with parallel sides or with sides which are tapered slightly along the length of the projecting end piece 56 to enable it to be more easily withdrawn from the molded passageway.

The moveable mold piece 54 is automatically inserted into the mold shape of the loop element 12 when the mold halves are closed, and is automatically withdrawn from the mold shape of the loop element when the mold halves are opened.

As illustrated in FIG. 3, the pivotal mold piece 54 and projecting end piece 56 pivot in the direction of arrow 57 about a pin 58, secured to the housing of the first mold half. The first and second mold halves include corresponding half cavities 59, 60 to receive the pivotally mounted mold piece 54 when the first and second old halves are closed.

Figure 6:
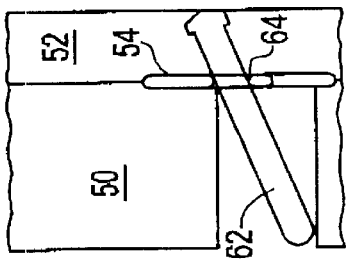

FIGS. 5 and 6 illustrate the operation of the pivotally mounted mold piece 54 in relation to an angled cam pin 62 which is used to mechanically displace the moveable mold piece 54 as the first and second sides of the mold 50, 52 are opened and closed during sequential molding operations.

The moveable mold piece 54 is pivotally supported about pin 58 on the first mold half 50. The second mold half supports and mounts the cylindrical cam pin 62 which pivotally moves the moveable mold piece 54 as the first and second mold halves are opened and closed relative to each other. The cam pin 62 extends through an aperture 64 in the moveable mold piece and also extends through an elongated aperture 66 in the first mold half. The cam pin is angularly supported and positioned relative to the direction 68 of closing and opening of the first and second mold halves to cause the moveable mold piece to pivot about 58 to cause the projecting end 56 to move into and out of the mold shape of the loop element. End limits of the arcuate displacement of the movable mold piece 54 are defined by an arcuate slot 70 in the movable mold piece 54 and a fixed lug 72 secured to the body of the first mold half 50.

The prior art discloses hydraulically actuated mold pieces for moving the mold pieces into and out of molding positions during and after molding operations. However, such hydraulical actuators are often large and cumbersome, and would not be able to be physically positioned in a relatively small mold such as a mold for a coordinate loop garment hanger. The relatively simple and compact angled mechanical cam pin 62 for pivotally actuating the moveable mold piece 54 of the present invention solves and eliminates these problems with prior art hydraulic actuators, and enables the coordinate loop garment hanger to be molded in a relatively simple and straightforward manner.

FIGS. 7, 7A and 7B illustrate a further embodiment of a hook receiving closed loop element 70 pursuant to the present invention which is similar to loop element 12 and additionally has a stop tab 72 projecting from the right back side of the loop element, as viewed in FIG. 7, to assist and guide the insertion and loading of a hanger hook through the loop element.

FIG. 7 is a front elevational view of the loop 70 and supporting flange member 28. FIG. 7A is a sectional view along arrows A—A in FIG. 7 and also shows the vertical web 30, and FIG. 7B is a bottom view of only the bottom 74 of the closed loop.

FIGS. 8, 8A and 8B illustrate a further embodiment of a hook receiving closed loop element 80 pursuant to the present invention which is similar to loop element 12 and additionally has support ribs 82 on opposite ends of the loop element which have the same width as the loop element 80 and the flange 28 and serve to further secure the loop element to the supporting flange member 28 and reinforce the strength of the attachment web 32. FIG. 8 is a front elevational view of the loop element 80 and supporting flange member 28. FIG. 8A is a sectional view along arrows A—A in FIG. 8 and also shows the vertical web 30, and FIG. 8B is a bottom view of only the bottom 84 of the closed loop element.

FIGS. 9, 9A, and 9B illustrate a further embodiment of a hook receiving closed loop element 90 pursuant to the present invention which is similar to loop element 12 and additionally has outwardly and upwardly flared (as viewed in FIG. 9) support ribs 92 on opposite ends of the loop element which have the same width as the loop element 90, and are slightly narrower in width than the flange 28, and serve to further secure the loop element to the supporting flange member 28 and reinforce the strength of the attachment web 32. As illustrated in FIG. 9A, the flange 28, attachment web 32 and top of the loop element 90 form a structure similar to an I beam. A substantially rectangularly shaped pocket 91 is formed on both sides of the attachment web 32, bounded on the left and right sides by the support ribs 92, bounded on the top by the flange 28, and bounded on the bottom by the top of the loop element 90. The two pockets 91 eliminate an unnecessary thickness of the molded plastic in the volumes of the pockets 91, to allow the molded plastic of the components 28, 32, 90 and 92 to be cooled and set more rapidly in the mold to speed the molding process. FIG. 9 is a front elevational view of the loop element 90 and supporting flange member 28. FIG. 9A is a sectional view along arrows A—A in FIG. 9 and also shows the vertical web 30, and FIG. 9B is a bottom view of only the bottom 90 of the closed loop element.

FIG. 9C is a sectional view, somewhat similar to FIG. 8A, of another embodiment of a hook receiving closed loop element 90' pursuant to the present invention wherein the supporting flange member 28 is integrally molded with two downwardly extending support ribs 95 which are integrally molded with the left and right sides of the closed loop element 90'. A crescent shaped aperture 97 is formed above and extends for the length of the passageway through the loop element 90', the interior of which is formed and molded by an appropriately shaped projecting end piece of the movable mold 54, similar to projecting end piece 56.

FIGS. 10, 10A and 10B illustrate a further embodiment of a hook receiving closed loop element 100 pursuant to the present invention which has a back side 102, as viewed in FIG. 10, which extends for the full length of the loop element 100, but has a centrally located narrow front side 104. The structure of this embodiment should assist and guide the insertion and loading of a hanger hook through the loop element 100 from either end. FIG. 10 is a front elevational view of the loop element 100 and supporting flange member 28. FIG. 10A is a sectional view along arrows A—A in FIG. 10 and also shows the vertical web 30, and Figure 10B is a bottom view of only the bottom 106 of the closed loop element, which has a somewhat triangular shape formed by angled bottom edges 108 extending between the narrow front 104 and wide back 102.

FIGS. 11, 11A and 11B illustrate a further embodiment of a hook receiving closed loop element 110 pursuant to the present invention which has a centrally located narrow front side 112, similar to the embodiment of FIG. 10, and wherein the opposite ends 114 of the back side 116 of the loop element are angled inwardly towards each other proceeding in a downward direction. FIG. 11 is a front elevational view of the loop element 100 and supporting flange member 28. FIG. 11A is a sectional view along arrows A—A in FIG. 11 and also shows the vertical web 30, and FIG. 11B is a bottom view of only the bottom 118 of the closed loop element which has a rounded rectangular shape.

FIGS. 12, 12A and 12B illustrate a further embodiment of a hook receiving closed loop element 120 pursuant to the present invention which is similar to loop element 12, but wherein the opposite ends 122 of the loop element are angled inwardly towards each other proceeding in a downward direction. Moreover, the top 124 of the loop element 120 is integrally formed with and the same width as the supporting flange 28. FIG. 12 is a front elevational view of the loop element 120 and supporting flange member 28. FIG. 12A is a sectional view along arrows A—A in FIG. 12 and also shows the vertical web 30, and FIG. 12B is a bottom view of only the bottom 126 of the closed loop element.

FIGS. 13, 13A and 13B illustrate a further embodiment of a hook receiving closed loop element 130 pursuant to the present invention which is similar to loop element 12, but wherein the closed loop element is attached to the bottom flange member 28 by an elongated attachment web 132, the length of which in a vertical direction would be determined by the particular coordinated outfit application. As is evident in the embodiment illustrated in FIG. 13, the vertical length of the attachment web 132 is substantially longer than the vertical height of the closed loop element 130. FIG. 13A is a sectional view along arrows A—A in FIG. 13 and also shows the vertical web 30, and FIG. 13B is a bottom 134 view of only the bottom of the closed loop element.

Moreover, the cross sectional shape of the passageway defined by the hook receiving loop element can vary substantially in different embodiments, as illustrated by the exemplary shapes of FIGS. 14–17.

FIG. 14 illustrates an embodiment wherein the cross sectional shape of the passageway defined by the hook receiving loop element 140 tapers from a wider width at the top thereof to a narrower width at the bottom thereof, which should make insertion and loading of a hanger through the loop element easier.

FIG. 15 illustrates an embodiment wherein the cross sectional shape of the passageway defined by the hook receiving loop element 150 tapers from a narrower width at the top thereof to a wider width at the bottom thereof, which provides a looser fit for a hanger hook suspended therefrom.

FIG. 16 illustrates an embodiment wherein the cross sectional shape of the passageway defined by the hook receiving loop element 160 is substantially circular.

FIG. 17 illustrates an embodiment wherein the cross sectional shape of the passageway defined by the hook receiving loop element 170 tapers from a wider width at the top portion thereof at 172 to a narrower width at the bottom portion thereof at 174. Moreover, in one embodiment the width of the transition junction 176 between the top portion 172' and the bottom portion 174 can be slightly narrower than the width of the bottom portion 174 to define somewhat of an hourglass shape. The width at the junction 176 is slightly narrower than the width of a hanger hook, such that a hanger hook inserted and loaded through the top portion 172 must be forcibly pushed and snapped through the junction 176, which provides a very secure retention of the hanger hook in the bottom portion 174.

The embodiments of FIGS. 1, 2 and 7–17 serve to illustrate that the molding principles illustrated in FIGS. 3–6 enable a support loop element constructed pursuant to the teachings of the present invention to take many different shapes and variations.

Moreover, the different features and aspects of the embodiments of FIGS. 1, 2 and 7–17 can be combined with each other to create further hybrid combined embodiments.

While several embodiments and variations of the present invention for a coordinate loop garment hanger are described in detail herein, it should be apparent that the disclosure and teachings of the present invention will suggest many alternative designs to those skilled in the art.

What is claimed is:

1. A garment hanger comprising:
   a molded plastic hanger body having a hook receiving loop element depending from and molded integrally with the molded plastic body at a lower portion thereof;
   said hook receiving loop element defining a passageway for selectively receiving and suspending therefrom a hook of a second garment hanger, which passageway is defined by left and right side elements along opposite sides of the length of the passageway, which length is defined along the direction a hook from a dependent garment hanger is inserted into and through the passageway, wherein at least a portion of the left and right side elements are aligned substantially perpendicularly across from each other along the left and right sides of the length of the passageway; and
   a hook member joined to the molded plastic hanger body at an upper portion thereof.

2. The garment hanger of claim 1, wherein the loop element passageway is at least partially enclosed by left, right, top and bottom surfaces along the length of the passageway, with open ends at opposite ends of its length.

3. The garment hanger of claim 1, wherein the left and right side elements completely enclose left and right sides of the passageway along the length of the passageway, with open ends at opposite ends of its length.

4. The garment hanger of claim 1, wherein the loop element passageway is completely enclosed on left, right, top and bottom surfaces along its length with open ends at opposite ends of its length.

5. The garment hanger of claim 1, wherein the passageway is curved along its length, with open ends of the passageway at opposite ends of its length being slightly lower than the center of the passageway, the top of the passageway curves with a radius R1 along the length of the passageway, the bottom of the passageway curves with a radius R2 along the length of the passageway, and R1>R2.

6. The garment hanger of claim 1, wherein a cross section of the loop element passageway defines a substantially rectangular shaped passageway, with the length of the rectangle extending in a vertical direction, and having substantially parallel left and right sides and rounded top and bottom surfaces.

7. The garment hanger of claim 1, wherein the widths of left, right, top and bottom walls forming the loop element are all substantially equal.

8. The garment hanger according to claim 1, further including a supporting flange member on the lower portion of the plastic hanger body to which the loop element is integrally molded and attached.

9. The garment hanger according to claim 8, wherein the loop element is attached to the flange member by an attachment web which extends along the length of the loop element.

10. The garment hanger of claim 8, wherein the external width of the loop element between its left and right outer surfaces is less than the width of the flange member on the lower portion of the plastic hanger body.

11. The garment hanger of claim 10, wherein the widths of left, right, top and bottom walls which form the loop element are all substantially equal.

12. The garment hanger of claim 11, wherein the loop element is attached to the flange member by an attachment web which extends the length of the loop element and which has a width substantially equal to the width of the walls of the loop element.

13. The garment hanger of claim 1, wherein the hook member comprises a formed metal wire hook member secured to the molded plastic hanger body at a central upper portion thereof.

14. The garment hanger of claim 1, wherein the hook member comprises a molded plastic hook member which is integrally molded with the hanger body at a central upper portion thereof.

15. The garment hanger of claim 1, wherein the hook receiving loop element also defines a second passageway centrally located along the length of the loop element and extending substantially perpendicularly to the length of the loop element, such that a second garment hanger can be suspended with the length of the second garment hanger extending substantially perpendicular to the length of the garment hanger.

16. A garment hanger according to claim 1, wherein the loop element further defines a stop tab projecting from one end of one side of the loop element to assist and guide the insertion and loading of a hanger hook through the loop element.

17. The garment hanger according to claim 1, further including a supporting flange member on the lower portion of the plastic hanger body to which the loop element is integrally molded and attached, and support ribs positioned on opposite ends of the loop element which have the same width as the loop element and the flange member, and serve to further secure the loop element to the flange member.

18. The garment hanger according to claim 8, further including a supporting flange member on the lower portion of the plastic hanger body to which the loop element is integrally molded and attached, and wherein the supporting flange member is integrally molded with left and right downwardly extending support ribs which are also integrally molded with the left and right sides of the loop element.

19. The garment hanger according to claim 18, wherein a crescent shaped aperture is formed above the loop element passageway which extends along the length of the loop element passageway.

20. The garment hanger according to claim 1, wherein one side of the loop element comprises a centrally positioned short length side element, and the second side of the loop element comprises a centrally positioned long length side element, which assists and guides the insertion and loading of a hanger hook through the loop element from either end.

21. The garment hanger according to claim 1, wherein opposite ends of the loop element are angled inwardly towards each other proceeding in a downward direction.

22. The garment hanger according to claim 1, further including a supporting flange member on the lower portion of the plastic hanger body to which the loop element is integrally molded and attached, and wherein the top of the loop element is integrally formed with and the same width as the supporting flange.

23. The garment hanger according to claim 20, wherein opposite ends of the second side of the loop element are angled inwardly towards each other proceeding in a downward direction.

24. The garment hanger according to claim 1, wherein the loop element is attached to the bottom flange member by an elongated attachment web.

25. The garment hanger according to claim 24, wherein the elongated attachment web has a vertical length substantially longer than the height of the loop element.

26. The garment hanger according to claim 1, wherein the cross sectional shape of the passageway defined by the hook receiving loop element tapers from a wider width at the top thereof to a narrower width at the bottom thereof.

27. The garment hanger according to claim 1, wherein the cross sectional shape of the passageway defined by the hook receiving loop element tapers from a narrower width at the top thereof to a wider width at the bottom thereof.

28. The garment hanger according to claim 1, wherein the cross sectional shape of the passageway defined by the hook receiving loop element is substantially circular.

29. The garment hanger according to claim 1, wherein the cross sectional: shape of the passageway defined by the hook receiving loop element tapers from a wider width at the top portion thereof to a narrower width at the bottom portion thereof, and the width of a transition junction between the top portion and the bottom portion is slightly narrower than the width of the bottom portion to define an hourglass shape.

30. The garment hanger of claim 29, wherein the width at the junction is slightly narrower than the width of a hanger hook, such that a hanger hook inserted and loaded through the top portion must be forcibly pushed and snapped through the junction, which provides a very secure retention of the hanger hook in the bottom portion.

31. The garment hanger of claim 1, wherein the molded plastic hanger body is molded in a mold comprised of first and second mold halves which include cavities which define the mold shape of the hanger body, and the mold further comprises a moveable mold piece which is inserted into the mold shape of the loop element of the plastic hanger body during a molding operation to define the interior of the passageway during the molding operation, and the moveable mold piece is subsequently withdrawn from the passageway defined thereby to allow the plastic hanger body to be released from the mold.

32. The garment hanger of claim 31, wherein the moveable mold piece is automatically inserted into the mold shape of the loop element when the mold halves are closed, and is automatically withdrawn from the mold shape of the loop element when the mold halves are opened.

33. The garment hanger of claim 32, wherein the moveable mold piece is pivotally supported on the first mold half, and the interior shape of the passageway is defined by the cross sectional shape of a projecting end of the movable mold piece, which has an outer radius $R1$ and an inner radius $R2$, such that the top of the passageway curves with a radius $R1$ along the length of the passageway, the bottom of the passageway curves with a radius $R2$ along the length of the passageway, and $R1>R2$.

34. The garment hanger of claim 33, wherein the second mold half supports a cam element which pivotally moves the moveable mold piece as the first and second mold halves are opened and closed relative to each other.

35. The garment hanger of claim 34, wherein the cam element comprises a cam pin which extends through an aperture in the moveable mold piece, and the cam pin is angularly supported and positioned relative to the direction of closing and opening of the first and second mold halves to cause the moveable mold piece to pivot into and out of the mold shape of the loop element.

36. The garment hanger of claim 35, wherein the cam pin extends through the aperture in the moveable mold piece and also extends through an aperture in the first mold half.

* * * * *